May 25, 1926.
E. W. GARD
1,585,971
LIQUID LEVEL INDICATOR
Filed June 9, 1925
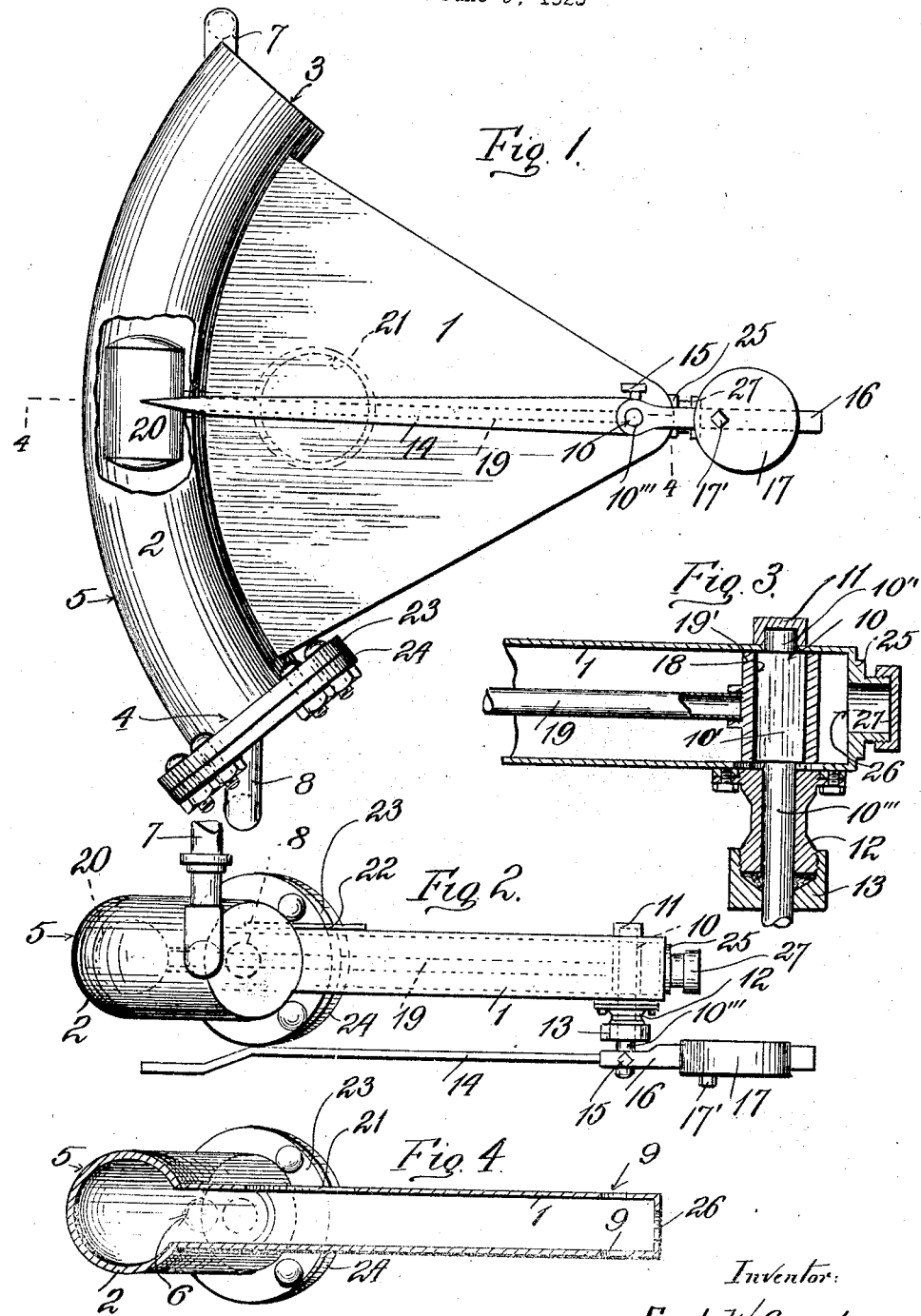
Inventor:
Earle W. Gard Patented May 25, 1926.

1,585,971

UNITED STATES PATENT OFFICE.

EARLE W. GARD, OF WILMINGTON, CALIFORNIA.

LIQUID-LEVEL INDICATOR.

Application filed June 9, 1925. Serial No. 35,849.

My invention relates to a means for indicating levels of liquids either in open or closed vessels, one of the prime objects of the invention being to provide a simple, compact and substantial device by which always an accurate and true record of the level of liquids may be indicated.

Another object of the invention is to provide an indicator which will eliminate the use of the usual breakable and unreliable gage glasses and thereby wholly insure against any fire hazards when the device is used for indicating levels of inflammable fluids.

Another object of the invention is to provide an index means in which neither capillarity of the liquid nor the color of same will interfere with the accurate reading of the indicator.

Another object of this invention is to provide an indicator which is easily attachable and detachable and may be readily insulated for the purpose of keeping warm certain fluids or substances which tend to congeal or solidify at low temperatures.

Another object of the invention is to provide a device of this character which is self contained; will permit of larger connections with vessels, thereby preventing clogging in lines, which is often the case with gage glasses; and which is wholly outside the vessel to which it is attached.

Another object of the invention is to provide a level recording means which may be readily and conveniently read at night without the necessity for close observation and inspection as is necessary with gage glasses and without artificial light.

Finally a further object of this invention is to provide a practical gage or indicator for vessels of considerable height as required and used for instance in the petroleum industry, which may be easily and instantly read regardless of the height at which it may of necessity be placed.

These and other objects are attained by the device shown in the accompanying drawing which illustrates a preferred form of embodiment of my invention, and in which—

Fig. 1 is a front view showing my invention.

Fig. 2 is a plan view.

Fig. 3 is an enlarged fragmentary, sectional view showing the association of the index finger with the float chamber, and Fig. 4 is a section on line 4—4 Fig. 1.

I have shown in the drawing one form in which I prefer to embody my invention which comprises broadly a chamber supported wholly outside the vessel, and provided with any known means for permitting the free passage of fluid to and from the chamber, and having an index device for registering the level of the fluid in the vessel.

Specifically referring to the drawing, the invention is shown as comprising a closed segmental chamber 1 provided with an arcuate cylindrical compartment 2, closed at the top and bottom 3 and 4 respectively. The cylindrical arcuate compartment 2 is shown as consisting of a section of pipe 5 having an opening 6 cut therein corresponding to the shape of the segmental chamber 1 which is united to the pipe 5 preferably by welding, and it will be understood that the chamber and compartment referred to may be made in any of a variety of ways without departing from the spirit of the invention. The arcuate cylindrical compartment 2, constitutes a float compartment, as will be explained later, and is in open communication with the segmental chamber 1, the arcuate form of the compartment 2 and segmental form of the chamber 1 being adopted preferably for the essential purpose of reducing the bulk of material, lessening the weight without sacrificing strength, and economizing in material and labor. Means are provided for permitting a portion of the fluid from a vessel, the fluid level of which is to be determined, to enter and leave the chamber 1 and compartment 2, and there are means provided on the top and bottom respectively, of the arcuate cylindrical compartment 2, in the form of couplings 7 and 8 respectively by which the indicator may be supported wholly outside a vessel. Through unequal holes 9 at one end of the chamber 1, is extended an annular journal or shaft 10, having a square portion 10' for purposes appearing later. The annular end 10'' of said shaft is carried in a bearing 11, which may be in the form of a cap as shown, welded or otherwise secured to the outside of one wall of the chamber 1. The annular end 10''' of said shaft 10 is carried in a stuffing box 12 secured in any desirable manner to the outside of the other wall of said chamber 1, the usual threaded nut gland 13 being provided for forcing packing about the shaft. The annular end 10'''' of the shaft extends beyond the stuffing box 12 for mounting an indicator 14 which is arranged to operate in an arc adjacent to the arcuate compartment 2. This indicator 14 is shown as a part of an arm 16 which is arranged to be fastened in any suitable manner to the extended annular end 10''' of the shaft 10, by set screw 15. Upon this arm 16 is adjustably mounted a counterweight 17 for effecting a counterbalancing influence on the indicator, a set screw 17' or other desirable means being used to hold the counterweight in position after adjustment.

The aforementioned enlarged square portion 10' of the shaft 10 is passed through a sleeve 19', carrying by threaded engagement float rod 19 and float 20. This float is cylindrical and operates in the arcuate compartment 2, which guides the float and insures steadiness of its operation with the varying levels of fluid within the chamber and compartment. For the purpose of permitting convenient access to and dissembling of the parts where necessary, I prefer to provide a separate support for the float rod 19, and in the drawing this support is shown as a sleeve 19', provided preferably with the squared opening 18, as explained, by reason of which it may be slid over the square portion 10' of the shaft 10, and locked with the shaft to move therewith. The float rod 19 is then connected to said support or sleeve 19' by threaded means, access to said float rod 19, to effect the assembly or dissociation of the float 20 and sleeve 19', being provided by an opening 21 in one side of said chamber, this opening being normally covered by a plate 22.

One end of the arcuate compartment 2 is preferably provided with a flange 23, for bolting thereto or otherwise fastening a plate or cover 24, by the removal of which convenient access to the interior of the chamber 2 may be had. The aforementioned coupling 8 is, as seen, welded or otherwise secured to the cover 24.

On the end of the chamber 1, is preferably welded or otherwise secured a flanged nipple 25, the passageway in said nipple 25 registering with an orifice in the end of said chamber. A cap 27 threads on said nipple 25. Through the orifice 26, and passageway in said nipple 25, the float rod 19 may be removed after disconnection with and removal of the sleeve 19' laterally through one of the holes in the chamber 1, which obviously may be effected after dissociating the stuffing box 12.

What I claim, is:

A level indicator for fluids comprising a segmental chamber formed at one end thereof with an arcuate cylindrical compartment having free communication with said chamber and provided with a removable bottom, a fluid connection on the top of said compartment, a fluid connection on said removable bottom, said chamber having at the other end thereof an opening and a cap covering said opening and openings in the side walls of said chamber, a shaft extending through said openings and formed with a square portion, bearings for said shaft, a sleeve mounted upon the square portion of said shaft, a float operable within said arcuate compartment, a rod threadedly connecting said float with said sleeve, an index member on said shaft and outside said chamber, and an adjustable counterweight on one end of said index member.

In testimony whereof I have set my hand.

EARLE W. GARD.